United States Patent
Hirai et al.

[11] 3,984,176
[45] Oct. 5, 1976

[54] REFLECTIVE PLATES FOR A LIQUID CRYSTAL DISPLAY DEVICE

[75] Inventors: Hirotomo Hirai; Kenjiro Yagi, both of Tokyo, Japan

[73] Assignee: Kabushiki Kaisha Daini Seikosha, Japan

[22] Filed: Jan. 29, 1975

[21] Appl. No.: 545,221

[30] Foreign Application Priority Data
Jan. 31, 1974 Japan.............................. 49-13153

[52] U.S. Cl........................... 350/160 LC; 350/188
[51] Int. Cl.²...................... G02F 1/13; G02B 13/20
[58] Field of Search.......... 350/160 LC, 160 P, 188, 350/126; 240/1 EL

[56] References Cited
UNITED STATES PATENTS
3,833,288  9/1974  Nilsson ................... 350/188
3,881,809  5/1975  Fergason ................ 350/160 LC FOREIGN PATENTS OR APPLICATIONS
769,422  10/1967  Canada .................. 350/126
1,944,364  3/1970  Germany ................ 350/126

OTHER PUBLICATIONS
R. F. Bush, P. E. Seiden, "Liquid Crystal Display Device," IBM Technical Disclosure Bulletin, vol. 14, No. 1, June 1971, pp. 223.
W. N. Jacobus, Jr. and K. P. Stuby, "Visible Light-Emitting Diode," IBM Technical Disclosure Bulletin, vol. 10, No. 8, Jan. 1968, pp. 1120.

*Primary Examiner*—John K. Corbin
*Assistant Examiner*—Rolf Hille
*Attorney, Agent, or Firm*—Robert E. Burns; Emmanuel J. Lobato; Bruce L. Adams

[57] ABSTRACT

Reflective plates for liquid crystal display devices are provided. These plates comprise a composite of a transparent base material as a matrix and having incorporated therein a plurality of small transparent grains or granules. These granules have a different refraction ratio from the matrix material. The reflective composite plate member comprises said matrix and said grains and may have a reflective surface coated or attached to one face of said plate member.

Light entering into said composite reflective plate member is refracted by the grains thus providing a distinctive background appearance for the display device into which this plate is incorporated. The light is reflected variably because of the different refractive paths reaching the eye of the observer via the display device.

10 Claims, 3 Drawing Figures

REFLECTIVE PLATES FOR A LIQUID CRYSTAL DISPLAY DEVICE

FIELD OF THE INVENTION

This invention relates to reflective plates for liquid crystal display devices.

BACKGROUND OF THE INVENTION

In a field effect, liquid crystal, display device, a reflective plate is used at the rear of the liquid crystal display device.

FIG. 1 shows the basic construction of such field effect type liquid crystal display devices, the liquid crystal material 1 is inserted between a pair of glass plates 21 and 22, at least one of which has a conventionally activated patterned electrode for a controlled display of information; a pair of rectilinear polarized plates 31 and 32, in each of which the direction of polarization is respectively crossed, are disposed to the outside of said glass plates 21 and 22.

The reflective plate 4 is disposed as the back element of said display device. The reflective plate 4 is employed to provide high reflection and light scattering. To improve and enhance the reflection, metals such as aluminum or silver are coated or applied to the back or outer face of the transparent material of the reflective plate 4 to provide the reflective face 4b. A coarse or diffusion face 4a is shaped on the inner face of the transparent material of reflective plate 4 by abrasion or sand blasting or the application of a diffusive material. These treatments provide the reflective plates of the prior art but raise the cost by requiring the processes of polishing of reflective face 4b and abrading coarse face 4a.

OBJECT OF THE INVENTION

The present invention aims at eliminating the above noted difficulties, insufficiencies, and inefficiencies. It is a primary object of the present invention to provide a novel reflective plate for liquid crystal display devices which has a plurality of small transparent grains embedded in the body of said reflective plate. It is a further object of the present invention to provide display devices utilizing such novel plates.

It is a further object of this invention to provide display devices which can be indirectly illuminated by side positioning lighting sources.

SUMMARY OF THE INVENTION

According to the present invention, there is provided, as the reflective plate for use in liquid crystal display devices, a transparent base material or matrix which has incorporated therein a plurality of small and transparent grains. The grains are distributed through the body of the matrix and the grains are of material having a different refraction index or ratio plate member is a mixture of said transparent base material and said grains, said grains having a different refraction index from said transparent base material and are distributed through this transparent matrix. The novel plates are further provided with a reflective face that is coated, installed or adhered to the face of the plate member which is distal to the liquid crystal. Light which falls into said mixture forming the novel reflective plate of this invention is reflected by the grains and produces a distinct textured background to the display device when viewed by light which reaches the eyes of the observer via the display device.

BRIEF DESCRIPTION OF THE DRAWINGS

The above-mentioned and further objects, features and advantages of the present invention will become more obvious from the following description when taken in connection with the accompanying drawings, which show one preferred embodiment of the invention, wherein.

DETAILED DESCRIPTION OF THE INVENTION

Figure 1:
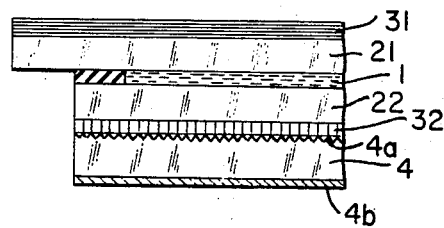
FIG. 1 shows a cross-sectional view of the conventional liquid crystal display device using the prior art reflective plates.
Figure 2:
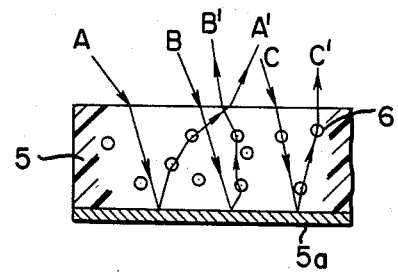
FIG. 2 shows a cross-sectional view of a portion of the reflective plate according to this invention.
Figure 3:
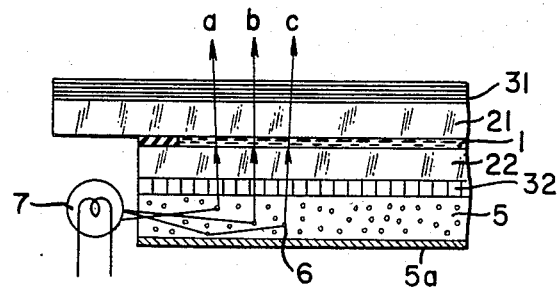
FIG. 3 shows a cross-sectional view of the display device according to this invention incorporating as the rear element thereof the novel reflective plates of this invention.

This invention will be explained by references to the accompanying drawings in which FIGS. 2 and 3 show liquid crystal cavity 1 defined by a pair of glass plates 21 and 22. At least one of plates 21 and 22 bear a set of patterned electrodes (not shown) actuated by conventional circuitry for imparting display patterns to said liquid crystals for viewing of the displayed information. Rectilinearly polarized plates 31 and 32 (which are respectively crossed) disposed to the outsides of the glass plates 21 and 22 which confine the liquid crystal.

Transparent material 5 is a base material or matrix which is highly transparent thus having a high light penetration ratio and has incorporated therein grain 6 composed of another transparent material having a different refraction ratio from said transparent matrix material 5. The composite, forming reflective plate 5, is prepared by admixing grain 6 into the transparent matrix material 5 and forming the mixture into plate shape by conventional methods such as casting, molding, or similarly grossly forming the material and then cutting the grossly formed material to the proper dimensions and shape. Reflective plate 5 then comprises the transparent matrix material having incorporated and distributed therethrough refractive grains 6.

Reflective plate 5 is provided with a reflective or mirror face 5a formed to one side of said reflective plate 5 by coating thereon a metal having a high reflection ratio. The coating of the metal having a high reflection ratio may be by sputtering, vacuum metallizing, electro or chemical plating, or adherence of a foil or metal to one face of said reflective plate 5. This face should be positioned in the liquid crystal display device distal to the viewing face. Light from said reflective plate 5 should travel through the liquid crystal chamber 1 defined by glass plates 21 and 22 to the viewer positioned on the other side of polarizing plates 31 and 32 and distal to said reflective plate 5.

As a detailed and preferred embodiment acrylic polymer is used as the matrix or base transparent material 5 and styrene grains are used as grain 6. Accordingly, since the refraction ratio of acrylic polymers when cast into transparent plates is 1.49, and the refraction ratio of said styrene beads is 1.54, these materials are suitable and preferrable as materials to make the reflective plates 5 of this invention.

Furthermore, the preferred diameter for said styrene grains is in the magnitude of about 0.05 mm. (50 microns). The weight of the amount of grain incorporated into the base transparent acrylic material may vary as follows:

| EXAMPLE | |
|---|---|
| Base material (Methyl methacrylate) | 150 Gms. |
| Grain (Polystyrene) | 3–22.5 Gms. |

Thus, the amount of said styrene polymer grains are variable from 2% to 15% by weight of the matrix material. When more than about 15% by weight of polystyrene grains is used, the transparency and contrast of the reflective plate is decreased and the acrylic material providing the structural matrix of said reflective plate becomes fragile.

When the amount of the polymer grain material incorporated into the matrix is less than about 2% by weight, the light dispersion of said reflective plates diminishes and a strong directional characteristic of such reflective plates is noted.

Among forming means for the reflective mirror face 8a there may be mentioned sputtering or vacuum coating of aluminum and silver which are preferred but an excellent substitute is the use of an adherent aluminum foil. Such adherent foil also provides good reflection coatings.

Now, referring to FIG. 2 which illustrates the construction of reflective plate 5 of this invention, when light rays from points A, B, and C enter into said matrix material 5, and light reaches to said mirror face 5a, the rays are reflected by said mirror face 5a while being refracted by said grain 6. Then said light rays from A, B, and C exit from transparent base material 5 as rays A', B', and C'. They are refracted to random orientations by grains 6.

The distinctive background of the display devices is caused by the said light rays which reach the eyes of the observer after random refraction, via said liquid crystal display device.

Further, in the embodiment of FIG. 3, a light source 7 is positioned to one side of reflective plate 5. The light rays from said light source 7 are dispersed by said grains 6, as a, b, and c then the effect of an illuminated device having an illuminated background is easily and efficiently obtained.

Further, the reflective plate which includes the transparent grain 6 and transparent material 5 according to this invention needs no further surface polishing as good reflection is provided by the metallizing processes (set forth above). As set forth above, the acrylic resin and the polystyrene beads are described as a preferred embodiment. However, other transparent matrices may be used and other transparent beads may be used provided there is a difference in the refractive indexes between said matrix and said bead materials. Generally, the beads may vary in size from about 5 microns to about 500 microns but the range of approximately 50 microns is preferred as providing a satisfactory graininess to the viewed images. Further, the mixture including the transparent grain material 6 and the transparent base material or matrix 5 is easily obtained by usual commercial and industrial processes and thus the product utilizing common means of mass production are excellent for use in mass produced devices based upon liquid crystal displays. Furthermore, as these reflective plates can be easily and simply mass produced they provide a means for the inexpensive manufacture of mass produced liquid crystal devices such as watches and pocket calculators.

Furthermore, as reflective plate 5 requires no polishing it is structurally strong even in the form of thin plate. It can therefore be utilized and is preferable for use in the precise construction of watches having liquid crystal display means.

What we claim and desire by Letters Patent is:

1. In a liquid crystal display device the improvement which comprises a reflection plate consisting of a generally planar element comprising, in combination, a solid transparent matrix having randomly distributed therethrough a plurality of transparent grains; said matrix being a transparent acrylic polymer and said grains being a transparent styrene polymer, said grains having a refractive index differing from the refractive index of said matrix.

2. The plate according to claim 1 wherein said grains comprises 2 to 15 weight percent of said matrix.

3. The plate according to claim 1 wherein said plate comprises proximate surface and a distal surface, said distal surface being coated with a reflective material.

4. The plate according to claim 3 wherein said reflective material is a layer of a reflective metal coated upon said distal surface.

5. The plate according to claim 3 wherein said reflective material is a layer of reflective metal adhered to said distal surface.

6. The plate according to claim 1 wherein said acrylic polymer is methyl methacrylate and said grains of styrene polymer are polystyrene granules.

7. The plate according to claim 6 wherein said grains are in the size range of 5 to 500 microns in diameter.

8. The plate according to claim 7 wherein said polystyrene grains are about 50 microns in diameter.

9. A liquid crystal display device comprising a cavity containing liquid crystals; means for aligning portions of said liquid crystals in said cavity via patterned electrodes in proximity to said liquid crystals; polarizing means interposed for viewing said patterned liquid crystals; reflective plate means positioned for reflecting and refracting incident light through said liquid crystals and said polarizing means for viewing the display patterns in said liquid crystals, wherein said reflective plate means comprises the reflective plate consisting of a generally planar element comprising, in combination, a solid transparent matrix having randomly distributed therethrough a plurality of transparent grains; said matrix being a transparent acrylic polymer and said grains being a transparent styrene polymer, said grains having a refractive index differing from the refractive index of said matrix.

10. The liquid crystal display device according to claim 9 wherein the reflection plate is illuminated by a light source lying in the plane defined by said reflective plate means.

* * * * *